June 5, 1962 P. JUNOD 3,037,830
PLUNGER PUMP, MORE PARTICULARLY FOR LIQUID ATOMISER
Filed Sept. 17, 1959
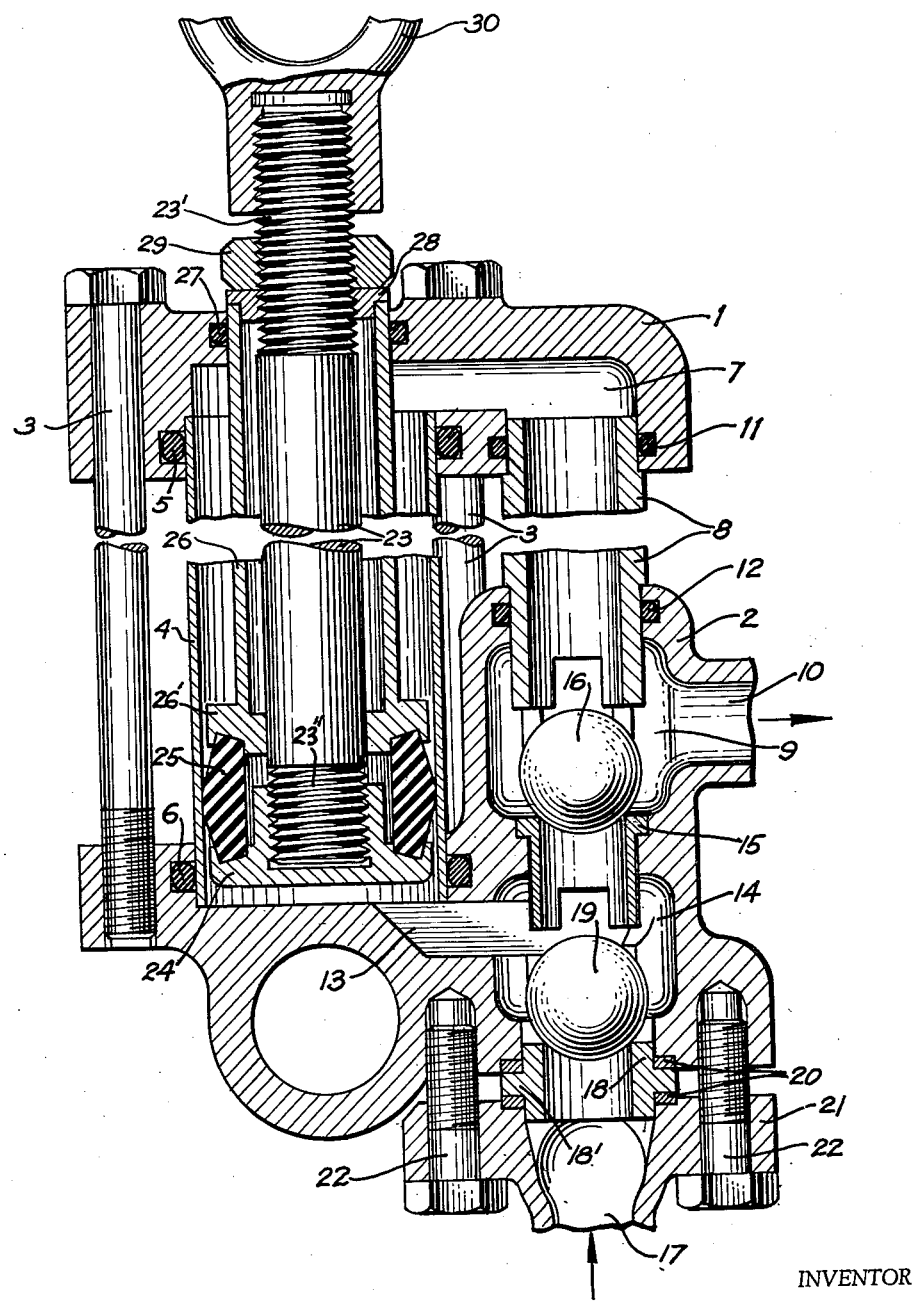
INVENTOR
PAUL JUNOD
BY Toulmin & Toulmin
ATTORNEYS

United States Patent Office 3,037,830
Patented June 5, 1962

3,037,830
PLUNGER PUMP, MORE PARTICULARLY FOR
LIQUID ATOMISER
Paul Junod, 24, Ave. de Plan, Vevey, Switzerland
Filed Sept. 17, 1959, Ser. No. 840,595
Claims priority, application Switzerland Sept. 22, 1958
5 Claims. (Cl. 309—4)

This invention relates to plunger pumps of use, more particularly but not exclusively, for supplying a liquid atomiser for general plant treatment.

It has been found that in the conventional plunger pumps used for such treatments heretofore the plungers do not remain sealing-tight for very long, for the liquids used are often very harmful to the substances, such as rubber or neoprene, used for the plunger head packings. To replace or readjust the packings, the plunger must be completely disassembled, a job which is a nuisance to the operator because he has to handle parts coated with substances which are usually injurious.

It is an object of this invention to obviate these disadvantages. The invention has as its subject matter a pump comprising at least one plunger, the head of which comprises an annular packing clamped between a member secured to the plunger rod end and a sleeve surrounding the rod, the sleeve being movable therealong by a nut co-operating with a screwthrreaded part of the rod, said screwthreaded part being at the opposite end of the rod to the head and being outside the pump body.

A plunger pump embodying the invention is illustrated by way of example in the accompanying drawing, the single FIGURE being a view of the pump in sectional elevation.

The pump illustrated is a fully compensated double-acting vertical single pump-plunger pump and comprises a pump body consisting of a top member 1 and bottom member 2 secured to one another by three bolts 3, only two of which can be seen in the drawing. A stainless steel or brass cylinder 4 is fitted in sealing-tight manner in the pump body members 1, 2 with the interposition of packing rings 5, 6. The cylinder 4 opens at the top into a recess 7 which communicates through a connecting tube 8 and a chamber 9 with a delivery pipe 10. The tube 8 is adjusted to be a sealing-tight fit in the chamber formed by the members 1, 2 by means of packing rings 11, 12.

The cylinder 4 opens at the bottom into a recess 15 which, by way of chamber 14, communicates on the one hand with the chamber 9 through a sleeve 15, the top aperture of which forms the seat for a ball 16, and on the other hand with an intake pipe 17 through a sleeve 18 which is coaxial with the sleeve 15 and the top aperture of which forms the seat for a ball 19 forming the intake valve. The sleeve 18 is clamped in sealing-tight manner by its outer flange 18', which has two packing rings 20, between the bottom wall of the pump body member 2 and a flange 21 secured by two bolts 22 to the member 2. The flange 21 forms the mouthpiece of the intake pipe 17.

Arranged in the cylinder 4 is a plunger having a rod 23 comprising a screwthreaded top part 23' and a screwthreaded bottom part 23". Screwed on to the latter is a plunger head 24 formed in its top surface with an annular groove in which engages the bottom edge of a rubber or neoprene annular packing 25 having a convex outer surface adapted to co-operate continuously with the wall of the cylinder 4. The top edge of the packing 25 engages in an annular groove in the annular base 26' of a sleeve 26 surrounding the plunger rod 23; the base 26' is adjusted to be a close fit on the smooth part of the rod 23 and the top of the sleeve 26 is adjusted to be a close and sealing-tight fit, by means of a packing ring 27, in a machined bore in the top pump body member 1. An annular cover 28 closes the top aperture of the sleeve 26 which, even when the plunger is at the bottom of its downward stroke, is outside the member 1. A nut co-operating with the top screwthreaded part 23' of the rod 23 acts upon the cover 28 so that the packing 25 can be clamped between the plunger head 24 and the base 26', an arbitrary control thus being provided of the friction between the packing 25 and the wall of the cylinder 4. By tightening the nut 24, therefore, play in the packing due to wear or weakness can be taken up at any time without disassembly of the plunger and without the packing itself being touched.

The sleeve 26 is rigidly locked with the plunger and is moved therewith in the cylinder by the drive rod, the top 30 of which is screwed to the screwthread end 23' of the rod 23.

The drawing shows clearly how the pump operates. When the plunger rises, liquid is sucked into the bottom of the cylinder 4 through the pipe 17, the open valve 19, the chamber 14 and the recess 13. When the plunger descends, the liquid filling the cylinder above the head 24, 25, 26' is urged through the recess 13, chamber 14, sleeve 15 and open valve 16 into the chamber 9 towards the delivery pipe 10. Some of the liquid, however, rises through the connecting tube 8 and fills the space above the base 26' of the sleeve 26 between the same and the wall of the cylinder 4. During the next intake stroke the last mentioned liquid is delivered through the recess 7 and the tube 8 into the chamber 9 and delivery pipe 10. The liquid which is required to atomise is therefore delivered substantially continuously and smoothly.

What I claim is:

1. In a pump assembly having a pump body and a cylinder provided in said body, a piston comprising a lower support plate, said lower plate being slightly smaller than the bore of said cylinder and having a threaded central opening, a piston rod having a lower and an upper threaded end, said piston rod being rotatably held in said threaded central opening with said lower threaded end, a sleeve surrounding said piston rod and having at its lower end an integrally attached upper support plate, said upper plate being slightly smaller than the bore of said cylinder and being apertured to allow projection by said piston rod, said sleeve being covered toward the outside of said cylinder by a centrally apertured cover, the aperture of said cover being threaded for rotatably receiving the upper threaded end of said piston rod, an annular resilient packing held by opposing flanges in said upper and lower support and a handle provided at the outside of said piston rod and outside of said pump body whereby said piston rod can be rotatably adjusted so as to move said lower support plate against said upper support plate to increase the frictional engagement between said packing and the inner wall of said cylinder without the need of removing any parts from the pump assembly prior to adjustment.

2. A piston as claimed in claim 1 wherein the outside of said packing has a convex periphery.

3. A piston as claimed in claim 1 wherein said packing has a convex outer periphery and a straight inner periphery.

4. A piston as claimed in claim 1 wherein the material of said packing is rubber.

5. A piston as claimed in claim 1 wherein the material of said packing is neoprene.

References Cited in the file of this patent

UNITED STATES PATENTS

| | | |
|---|---|---|
| Re. 15,806 | Harasta | Apr. 1, 1924 |
| 1,536,025 | Lamb et al. | Apr. 28, 1925 |
| 1,558,749 | Mueller | Oct. 27, 1925 |
| 1,740,931 | McMahon | Dec. 24, 1929 |
| 1,744,565 | McMahon | Jan 21, 1930 |
| 2,025,288 | Johnson | Dec. 24, 1935 |
| 2,276,009 | Baldwin | Mar. 10, 1942 |
| 2,468,511 | Pilch | Apr. 26, 1949 |
| 2,600,061 | Lord | June 10, 1952 |
| 2,907,614 | Rosen | Oct. 6, 1959 |